US007584469B2

(12) United States Patent
Mitekura et al.

(10) Patent No.: US 7,584,469 B2
(45) Date of Patent: Sep. 1, 2009

(54) METHOD, APPARATUS, AND COMPUTER PROGRAM PRODUCT FOR INSTALLING DEVICE DRIVERS FOR PERIPHERAL DEVICES

(75) Inventors: Yoshihiro Mitekura, Yokohama (JP); Shigekazu Tsuji, Tokyo (JP); Miho Miyagawa, Yokohama (JP)

(73) Assignee: Ricoh Company Ltd., Tokyo (JP)

( * ) Notice: Subject to any disclaimer, the term of this patent is extended or adjusted under 35 U.S.C. 154(b) by 535 days.

(21) Appl. No.: 11/060,480

(22) Filed: Feb. 18, 2005

(65) Prior Publication Data

US 2005/0188381 A1 Aug. 25, 2005

(30) Foreign Application Priority Data

Feb. 20, 2004 (JP) ............................. 2004-044982
Oct. 29, 2004 (JP) ............................. 2004-317306

(51) Int. Cl.
*G06F 9/445* (2006.01)
(52) U.S. Cl. .................. 717/174; 717/178; 719/321; 719/327
(58) Field of Classification Search ......... 717/170–178; 719/321, 327; 358/1.15; 713/1, 2
See application file for complete search history.

(56) References Cited

U.S. PATENT DOCUMENTS

| 6,681,392 | B1* | 1/2004 | Henry et al. ............... 717/176 |
| 6,822,753 | B1* | 11/2004 | Momose .................... 358/1.13 |
| 6,959,437 | B2* | 10/2005 | Schacht et al. ............... 719/321 |
| 7,185,336 | B2* | 2/2007 | Vaughan .................... 717/178 |
| 2002/0069353 | A1* | 6/2002 | Smith .......................... 713/1 |
| 2002/0129353 | A1* | 9/2002 | Williams et al. ............ 717/175 |
| 2003/0093768 | A1* | 5/2003 | Suzuki ....................... 717/100 |
| 2003/0115302 | A1* | 6/2003 | Teraoaka et al. ............ 709/221 |
| 2003/0234877 | A1 | 12/2003 | Kanehiro et al. |
| 2004/0003135 | A1* | 1/2004 | Moore ........................ 709/321 |
| 2004/0205778 | A1* | 10/2004 | Wong et al. ................. 719/321 |
| 2004/0250265 | A1* | 12/2004 | Suzuki et al. ............... 719/321 |
| 2005/0055690 | A1* | 3/2005 | Cornillon et al. ............ 717/174 |
| 2005/0138617 | A1* | 6/2005 | Friedman .................... 717/174 |
| 2006/0037029 | A1* | 2/2006 | Yamada ...................... 719/327 |

FOREIGN PATENT DOCUMENTS

JP 11-112701 4/1999

(Continued)

OTHER PUBLICATIONS

Proposal of a support for device driver generation, Katayama, T.; Saisho, K.; Fukuda, A., Software Engineering Conference, 1999. (APSEC '99) Proceedings. Sixth Asia Pacific, 1999, IEEE, pp. 494-497.*

(Continued)

*Primary Examiner*—Wei Y Zhen
*Assistant Examiner*—Satish Rampuria
(74) *Attorney, Agent, or Firm*—Oblon, Spivak, McClelland, Maier & Neustadt, P.C.

(57) ABSTRACT

A method, apparatus and computer program product for controlling the installation of device driver software which is executed on computer. The method includes the step of displaying an installation procedure for the device driver software and installing the driver software onto the computer.

6 Claims, 9 Drawing Sheets

FOREIGN PATENT DOCUMENTS

| | | |
|---|---|---|
| JP | 2000-32320 | 1/2000 |
| JP | 2000-259369 | 9/2000 |
| JP | 2001-109617 | 4/2001 |
| JP | 2002-123342 | 4/2002 |
| JP | 2004-15694 | 1/2004 |

OTHER PUBLICATIONS

A DSL approach to improve productivity and safety in device drivers development, Reveillere, L.; Merillon, F.; Consel, C.; Marlet, R.; Muller, G., Automated Software Engineering, 2000. Proceedings ASE 2000. The Fifteenth IEEE International Conference on, 2000, IEEE, pp. 101-109.*

UML for real-time device development, Sertic, H.; Rus, F.; Rac, R., Telecommunications, 2003. ConTEL 2003. Proceedings of the 7th International Conference on, vol. 2 Jun. 11-13, 2003, IEEE, pp. 631-636 vol. 2.*

Modeling and integration of peripheral devices in embedded systems, Shaojie Wang; Malik S.; Bergamaschi, R.A. Design, Automation and Test in Europe Conference and Exhibition, 2003, IEEE, 2003, pp. 136-141.*

Sertic, H.; Rus F.; Rac UML for real-time device driver development; IEEE, vol. 2; Jun. 2003; pp. 631-636.*

Shaojie Wang; Sharad Malik; Synthesizing operating system based device drivers in embedded systems; IEEE, Oct. 2003; pp. 37-44.*

* cited by examiner

FIG. 1

FIG. 2A
SOFTWARE INSTALLER

[INSTALL]
[QUIT]

FIG. 2B
DO YOU WANT TO TEST TRANSFERRING IMAGE DATA FROM THE CAMERA ?

[YES] [QUIT]

FIG. 2C
PLEASE TAKE A PICTURE BY A CAMERA.

[OK]

FIG. 2D
PLEASE CONNECT A CAMERA AND A PERSONAL COMPUTER BY USB CABLE.
IF A CAMERA AND A PERSONAL COMPUTER HAVE ALREADY CONNECTED, PLEASE DISCONNECT ONCE AND RE-CONNECT.
[OK]

FIG. 2E
HAVE YOU FINISHED CONNECTING ?

[CLOSE]

FIG. 2F
"FOUND NEW HARDWARE WIZARD" WILL START. SELECT [INSTALL FROM A LIST OR SPECIFIC LOCATION (ADVANCED)] AND THEN CLICK [NEXT].
[NEXT]

FIG. 2G
SELECT [SEARCH FOR THE BEST DRIVER IN THESE LOCATIONS], CHECK [INCLUDE THIS LOCATION IN THE SEARCH], CLICK [BROWSE], CHOOSE "C:\ProgramFiles\Ricoh\XP", AND THEN CLICK [NEXT].

[NEXT]

USB TROUBLE SHOOTER

[START]
[QUIT]

FIG. 5B

DO YOU WANT TO TEST TRANSFERRING IMAGE DATA FROM THE CAMERA ?

[YES] [QUIT]

FIG. 5C

PLEASE TAKE A PICTURE BY A CAMERA.

PLEASE CONNECT A CAMERA AND A PERSONAL COMPUTER BY USB CABLE.
IF A CAMERA AND A PERSONAL COMPUTER HAVE ALREADY CONNECTED, PLEASE DISCONNECT ONCE AND RE-CONNECT.
[OK]

FIG. 5E

HAVE YOU FINISHED CONNECTING ?

[CLOSE]

FIG. 5F

"FOUND NEW HARDWARE" WIZARD WILL START. SELECT [INSTALL FROM A LIST OR SPECIFIC LOCATION (ADVANCED)] AND THEN CLICK [NEXT].
[NEXT]

FIG. 5G

SELECT [SEARCH FOR THE BEST DRIVER IN THESE LOCATIONS], CHECK [INCLUDE THIS LOCATION IN THE SEARCH], CLICK [BROWSE], CHOOSE "C:\ProgramFiles\Ricoh\XP", AND THEN CLICK [NEXT].

[NEXT]

BEFORE DELETING UNKNOWN DEVICES

| DRIVER TYPE | DEVICE ID | CLASS (CATEGORY INFORMATION) |
|---|---|---|
| USB | DEVICE 1 | PORT |
| | DEVICE 2 | HID |
| | DEVICE 3 | UNKNOWN |
| | DEVICE 4 | UNKNOWN |
| | DEVICE 5 | IMAGING |
| 1394 | DEVICE 6 | SBP 2 |
| | DEVICE 7 | SBP 2 |

FIG. 8

AFTER DELETING UNKNOWN DEVICES

| DRIVER TYPE | DEVICE ID | CLASS (CATEGORY INFORMATION) |
|---|---|---|
| USB | DEVICE 1 | PORT |
| | DEVICE 2 | HID |
| | DEVICE 5 | IMAGING |
| 1394 | DEVICE 6 | SBP 2 |
| | DEVICE 7 | SBP 2 |

# METHOD, APPARATUS, AND COMPUTER PROGRAM PRODUCT FOR INSTALLING DEVICE DRIVERS FOR PERIPHERAL DEVICES

BACKGROUND OF THE INVENTION

1. Field of the Invention

The present invention relates to a method, system, apparatus and computer program product for controlling installation of software. And more particularly to a method and computer program suitable for installing drivers for peripheral devices.

2. Discussion of the Background

Recently, the number of people using digital equipment instead of an analog device is increasing. For instance, many people now use a digital still camera instead of a film camera. Such digital equipment is often connected to personal computer for a several purposes. In a case of a digital still camera, a digital still camera may be connected to personal computer by a USB (Universal Serial Bus) cable for playing a taken picture on computer screen, storing into a recoding media, such as a hard disk, CD-R/RW, DVD-R/RW, or the like, or printing. Before executing these operations on or with the computer, software such as image viewer and/or a device driver must be installed in the personal computer. However, some people are not familiar with personal computers. Therefore, they often do not know how to install drivers or other related software into personal computer and/or cannot understand how to install this software even if they read a manual of the equipment. Additionally, if a user tries to install software and fails, it is very hard for the user to fix the problem. To support such users, manufacturer may run a support center with an operator in the support center answering user's question or teaching a user by telephone on how to install the driver or related software. However, this is often a frustrating experience for the user. Also, the more people that use a vendor's digital equipment, the more users need support, and therefore the cost of running a support center increases.

Additionally, Japanese patent laid open no.: 2001-109617, corresponding to U.S. Pat. No. 6,822,753, discloses a computer readable media, anyone can setup easily for using printer without failure. However, these references preempt the installation wizard that may exist in the computer to which the printer/peripheral is being installed. By preempting the computer's native installation wizard, hardware authentication errors and other installation errors may occur.

Thus, as discovered by the present inventors, what is desirable is an ability to have a method, apparatus, and computer program product for presenting additional information while a computer's native installation wizard is stepping a user through an installation or troubleshooting procedure. Also, it is desirable to have an ability to check a registry of drivers and delete unknown, unwanted, out-of-date, or corrupted device drivers.

SUMMARY OF THE INVENTION

In view of the foregoing, it is an object of the present invention to provide a method for controlling installation of software and to provide a program for executing the method so that can a user of a peripheral device of computer can easily and correctly install a device driver of the peripheral device even if the user is not familiar with a computer.

These and/or objects of the invention may be provided by a method for controlling installation of a device driver software which is executed on computer having an interface to a peripheral device and controls connection between the computer and the peripheral device, the method includes the step of indicating installation procedure of a device driver software for the peripheral device into a basic software of the computer in a different manner to indication by the basic software and separately from the indication by the basic software.

In addition to the novel method for controlling installation of software just described, this patent specification may be implemented in many other specific forms, including in method or computer program, as will be apparent to those skilled in the relevant art(s), without departing from the spirit or scope of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology selected and it is to be understood that each specific element includes all equivalents that operate in a similar manner.

Figure 1:
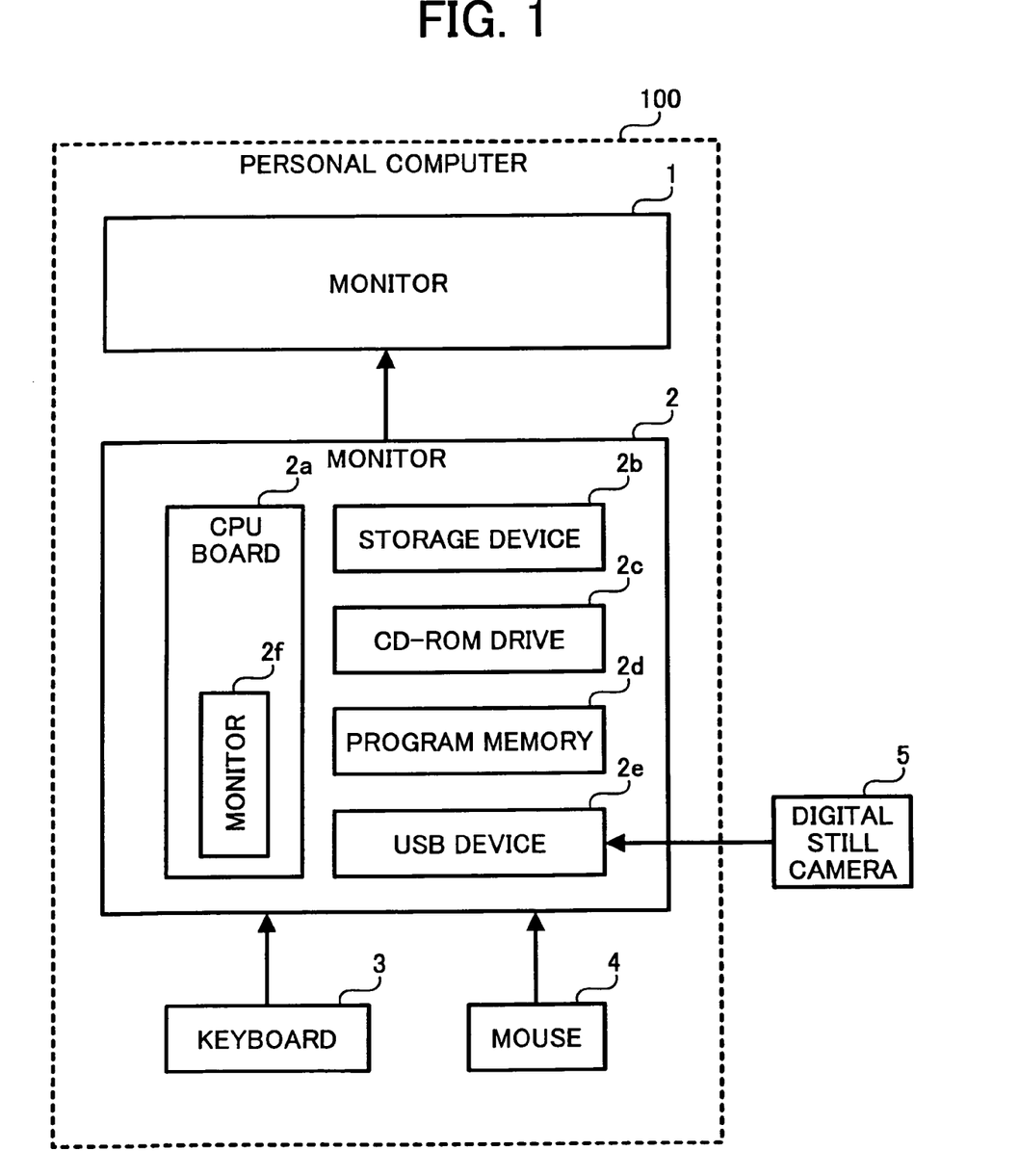
FIG. 1 is a block diagram of a personal computer in which installer software according to one embodiment of the present invention is installed.

FIG. 1 shows a block diagram of a personal computer having installer software of the present invention, and a digital still camera connected to the personal computer. According to one embodiment of the present invention, the installer is control software for installing software into the personal computer 100. The installer runs on the personal computer 100. The personal computer includes a display device 1, a body 2, a keyboard 3 and a mouse 4. The body 2 includes a CPU (Central Processing Unit) board 2a, a storage device 2b like a hard disk, a optical disk drive like a CD-ROM drive, a program memory 2d and USB device 2e. The CPU board 2a reads software from the program memory 2d and executes a procedure described in the software. The CPU board 2a also detects user operation on the keyboard 3 or the mouse 4, reproduces image data on the display device 1, transfer digital image data from a peripheral device like a digital still camera into the storage device 2e. Generally, software operates these hardware via operating system, i.e., basic software.

A CD-ROM is often used for storing an image viewer, which shows a catalogue of stored digital images, a USB device driver, which controls communication between the digital still camera 5 and the USB device 2e, and installer software, which controls installation of these software. The installer software reads this software from a CD-ROM by the CD-ROM drive 2c and expands the software into the storage device 2b for this software running on the personal computer 100. Software expanded into the storage device 2b is read and stored into the program memory 2d, and executed by the CPU of the CPU board 2a. According to one embodiment of the present invention, when the installer software is executed, registry information 2f in the personal computer 100 is checked. Registry check is executed by following procedure:

checking registry information corresponding to an installed USB device driver, and deleting descriptions in the registry about an unknown USB device driver.

Next, application software, such as image software, image transferring software or the like in CD-ROM, is installed into the personal computer, in other words, extent and stored in a Hard disk of the personal computer. And, a USB driver is installed into the personal computer, in other words, extent and stored in a Hard disk of the personal computer.

After installing this software, the camera indicates the installation is complete and asks a user on display device screen 1 whether the user want to test transferring image data from the camera to the personal computer. If the user chose "yes," the camera indicates an instruction of transferring image data from the camera on the display device screen 1. The instruction make the user execute transferring image data easily even if the user is not familiar with a personal computer.

Additionally, recent operating system has a function called "Plug and Play". A "Plug and Play" function is executed at connecting a personal computer 100 and a peripheral device like a digital still camera and displays a dialog box called "Wizard" for helping a user installing a device driver of the peripheral device. In description below, such a version of operating system is described as a version of operating system having a function displaying "Wizard." However, "Wizard" function of operating system displays a versatile message for consistent with any device. Therefore, the message displayed by "Wizard" function is often not enough for a user unfamiliar with a personal computer.

Thus, according to one embodiment of the present invention, the installation software detects the version of operating system. To detect the version of operating system may be executed by using a function prepared as a function of operating system. For instance, on Windows (registered trademark), "GetVersionEx" function can be use for detection of the version. And the detection can be achieved by embedding information, about versions of operating system having a function displaying "Wizard" message, in the installation software. If the version of operating system is a version having "Wizard" function, the installation software displays dialog box showing a setting message specialized for a digital still camera during displaying process of testing transferring digital image data. This specialized message helps a user to operate a personal computer for installing software even if the user is not familiar with a personal computer. This specialize message is displayed separately from a message of "Wizard."

Figures 4, 4A:
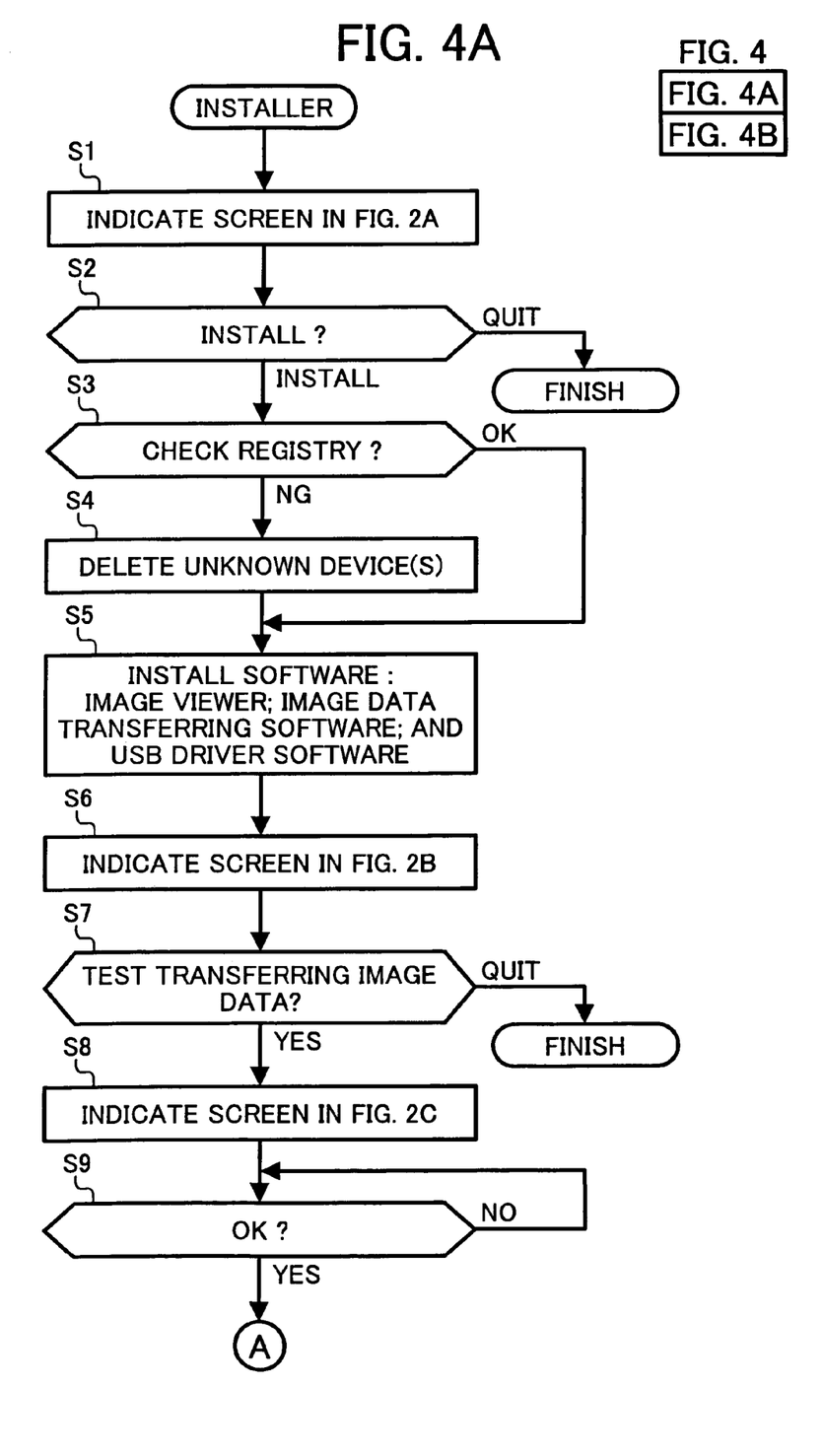
FIG. 4 is a flow chart of installation procedure by the installer software according to one embodiment of the present invention.
Figure 4B:
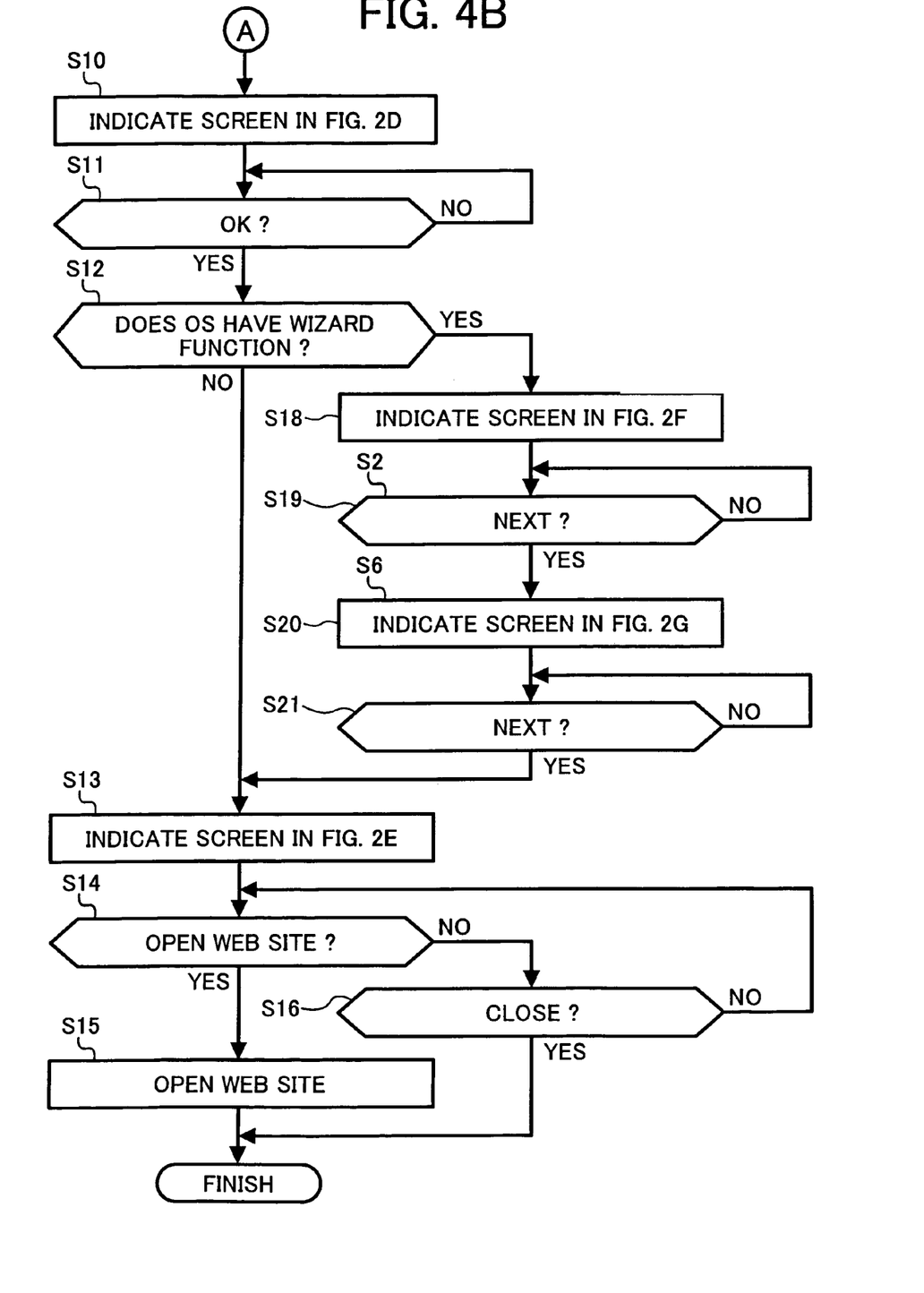

FIG. 2A-G show dialog boxes displayed in the display device 1 by the installer software. FIG. 4 shows a flow chart of procedure of the installer software. Detail action of the installer software is explained by using FIGS. 2 and 4.

Figure 2A:
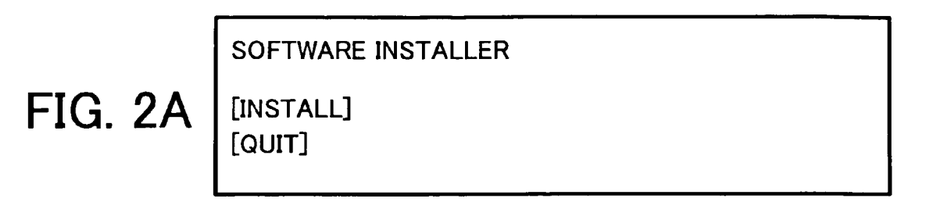
FIG. 2A-G are dialog boxes of the installer software which are displayed on a display device of the personal computer as shown in FIG. 1.
Figure 2B:
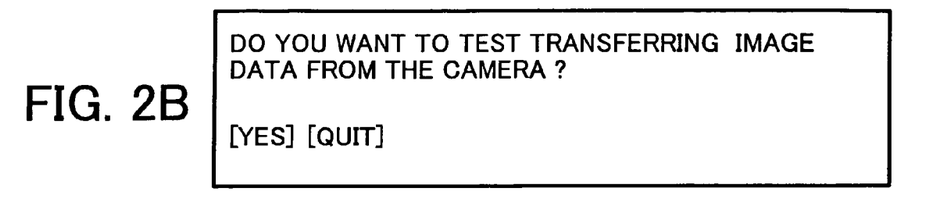
Figure 7:
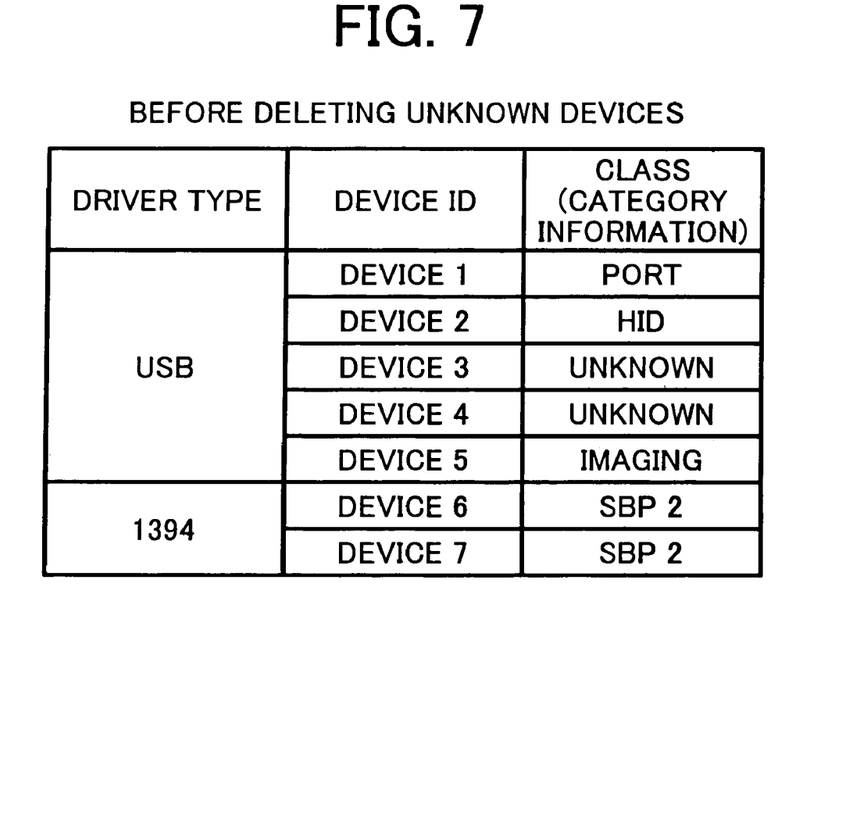
FIG. 7 is an explanatory diagram of a registry before detecting unknown devices.
Figure 8:
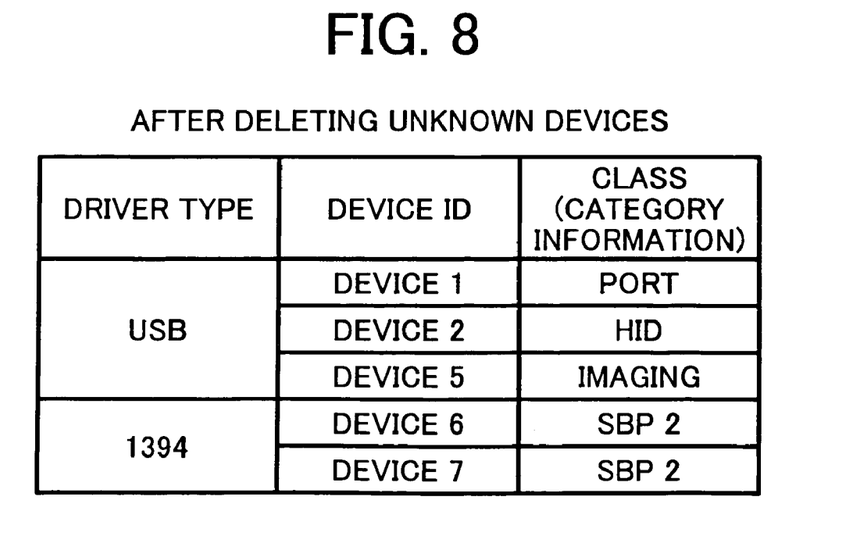
FIG. 8 is an explanatory diagram of a registry after detecting unknown devices.

First, a CD-ROM storing the installation software is set in the CD-ROM drive of the personal computer 100, and operating system automatically starts the installation software based on auto-run information. Then the installer software displays a dialog box as shown in FIG. 2A, at step S1. Next, the installation software waits for a mouse 4 clicked by a user, at step S2. If a user clicks a "Quit" button in the dialog box, the installer software erases the dialog box and the finish installation procedure. On the other hand, if a user clicks an "Install" button in the dialog box, a route of S2, the installation software starts an installation procedure. In a third step, S3, the installer software checks registry in the personal computer 100. If the installer software finds registry information corresponding with a device ID is unknown, a NG route of S3, the installer software deletes the unknown device from the registry, at step S4. In addition, unwanted, out-of-date, or corrupted device drivers may be detected and deleted. In one embodiment, the checking and deleting of the registry is preceded by a prompt to a user. For instance, in FIG. 7, "Device 3" and "Device 4" are unknown before checking registry, and in FIG. 8, these devices are deleted after checking. If the installer software does not detect an unknown device, an OK route of S3, the installer software installs image viewer software, a digital image data transferring software and a USB device driver, at step S5. For instance, these software is stored into a folder "C:\program files\Ricoh\Xp" in a storage device 2b like a hard disk.

Figure 2C:
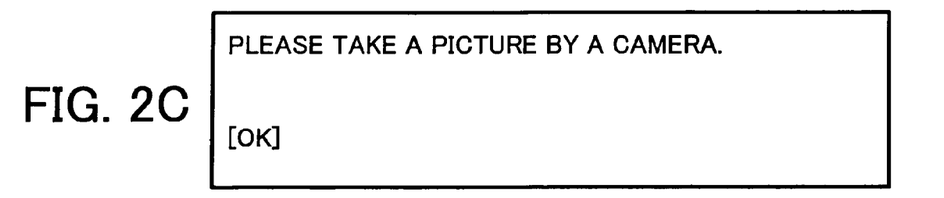
Figure 2D:
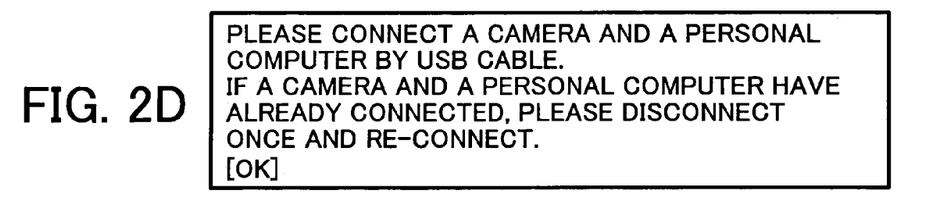

In a sixth step, the installer software displays a dialog box "Do you want to test transferring image data from the camera?" at step S6, and waits a "Yes" button or a "Quit" button in the dialog box clicked by a user, at step S7. If a user clicks the "Quit" Button, the installer software finishes the procedure. If a user clicks a "Yes" button, the installer software displays a dialog box "Please take a picture by a camera." as shown in FIG. 2C, at step S8. After a user taking a picture by camera, when a user clicks a "Yes" button in the dialog box, at step S9, the installer software displays a dialog box "Please connect a camera and a personal computer by USB cable. If a camera and a personal compute have already connected, please disconnect once and re-connect," as shown in FIG. 2D, at step S10. Then, if a user clicks an "OK" button in the dialog box, at step S11, the installer software checks whether a version of operating system, on which the installer software is running, is a version having a function for displaying "Wizard." Describing more detail, the installer software executes "GetVersionEx" function, which is prepared in "Windows" as described above, and checks a return value from the function, at step S12.

Figure 2E:
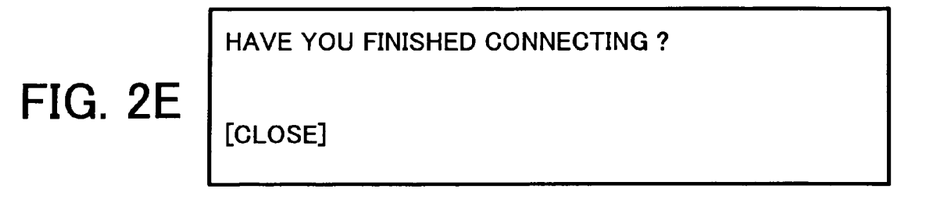

If the function returns a value which is not corresponding to a version having a function for displaying "Wizard," the installer software displays a dialog box "Have you finished connecting?" as shown in FIG. 2E, at step S13. Then the operating system in the personal computer 100 detects that a digital still camera 5 connection via a USB cable, and starts installing a USB device driver by "Plug and play." Additionally, according to one embodiment of the present invention, digital image data is transferred automatically from the digital still camera 5 to a storage device in the personal computer 100 after installation of the USB device driver is finished. If a user clicks a "Open Web" button in the dialog box "Have you finished connecting?" shown in the step S13, the installation software detects the "Open Web" button is clicked, at step S14, and display a web page at a predetermined URL (Universal Resource Locator), at step S15. When a user closes the web page, the installer software finishes this procedure. On the other hand, if the installer software does not detect the "Open web" button is clicked at the step of S14, the installer checks whether a "Close" button in the dialog box is clicked. When the installer software detects the "Close" button is clicked, at step S16, and finishes this procedure, at step S16. Otherwise, the installer software goes back to the step of S14.

Figure 2F:
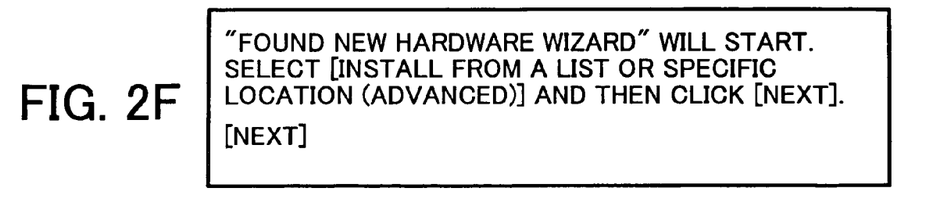
Figure 2G:
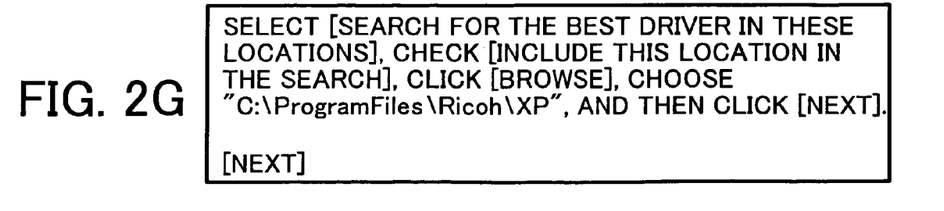
Figure 3:
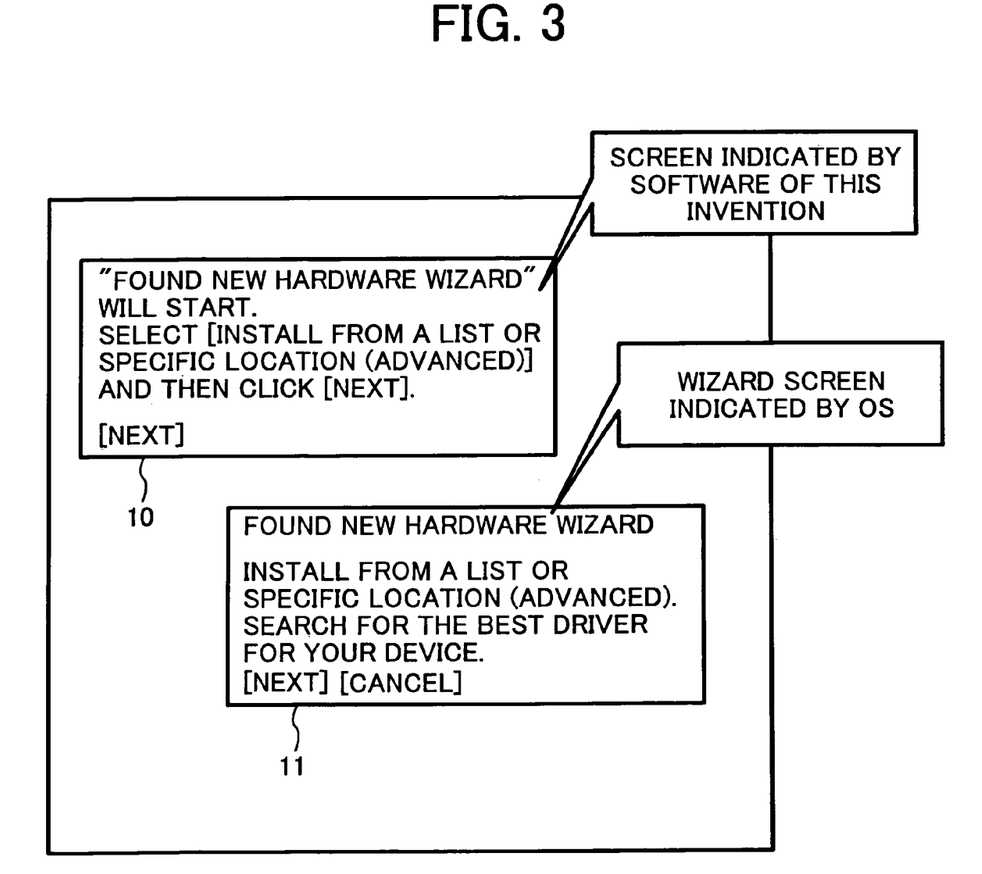
FIG. 3 is a display device view where the dialog boxes are displayed in order not to overlap to a dialog box which is displayed by operating system.

If the function returns a value which is corresponding to a version having a function for displaying "Wizard," the installer software displays a dialog box "'Found New Hardware' Wizard will start. Select [Install from a list or specific location (Advanced)] and then click [Next]," as shown in FIG. 2F, at step S18. In this step, the installer software displays the dialog box in the upper left of the display device 1 so that the dialog box does not overlap to a dialog box displayed by the operating system. Then the installer software wait until a user clicks a "Next" button in the dialog box, at step S19. When the installer software detects a user clicks the "Next" button, the installer software displays a dialog box "Select [Search for the best driver in these locations], check [Include this location in the search], click [Browse], choose 'C:\Program Files\Ricoh\XP', and then Click [Next]," as shown in FIG. 2G in the upper left of the display device 1, at step S20, and wait until a user click a "Next" button, at step S21.

When the installer software detects a user clicks the "Next" button, the installer software go to the step of S13. After the step of S13, the installer software execute a similar procedure with the case of a version having no function for displaying "Wizard" described above.

As described above, according to one embodiment of the present invention, the installer software displays a detail setting procedure corresponding to a "Wizard" dialog box displayed by operating system in response with a kind of operating system. Therefore a user can easily installs software, such as a USB device driver, by tracing a detail setting procedure displayed by the installer software, even if the user is not familiar with a digital device and/or a personal computer. And a user can also make sure that digital image data is correctly transferred from a digital still camera to a personal computer. Therefore, the present invention can reduce frequency of a user asking a digital still camera manufacturer about transferring a digital still camera to a personal computer, and reduce support cost of a manufacturer, such that salary, communication fee of toll free dial. Additionally, according to one embodiment of the present invention, the installer software can browse a web page, and a user can see more information about questions, problems or the like in the install procedure. In the above description, the installer software installs an application and a USB device driver, and tests transferring digital image data after installation. However, it can be achieved by preparing installer software only installing an application and/or a USB device driver, test software testing transferring digital image data and an executing software run the installer software and the test software serially.

According to another embodiment of the present invention, a USB connection trouble shooting software runs on a personal computer 100 as shown in FIG. 1, and troubleshoots on the USB connection. In this embodiment, a CD-ROM stores the USB connection trouble shooting software, an image viewer software, which shows a catalogue of stored digital images, an image transferring software, which transfers digital image data from a digital still camera 5 to the personal computer 100, a USB device driver, which controls communication between the digital still camera 5 and the USB device 2e, and a installer software, which controls installation of these software.

The installer software reads this software via CD-ROM drive and expands and stores this software into a storage device 2b, i.e. a hard disk, for executing this software on the personal computer 100. In other words, the installer software installs this software into the personal computer 100. Software stored in the storage device 2b is sent into a program memory 2d and executed by a CPU on a CPU board 2a. In this embodiment, the installer software reads the USB connection trouble shooting software, the image viewer software, the image transferring software and the USB device driver, and expands and stores this software into the storage device 2b, i.e. installs this software.

A way to troubleshoot, in the case that a user connect the digital still camera 5 to the personal computer 100 but cannot transfer digital image data, is explained below. Trouble can occur, for instance, when a user connects the digital still camera 5 to the personal computer 100 before installing software necessary for transferring digital image data, and continues installation in "Plug and play" without placing a CD-ROM in a CD-ROM drive, and the digital still camera is rejected as an unknown device.

In such situation, a user executes the USB connection trouble shooting software. First, the USB connection trouble shooting software checks registry information 2f in the personal computer 100 for searching a device ID whose registry information is unknown. If the USB connection trouble shooting software finds a device ID whose registry information is unknown, the registry information is deleted. Next, the USB connection trouble shooting software asks a user whether a user wants to test transferring digital image data from the digital still camera 5 to the personal computer 100, by displaying a dialog box on the display device 1. If a user selects transferring test, the USB connection trouble shooting software display a procedure to transferring digital image data. A user can easily transferring digital image data from the digital still camera 5 to the personal computer 100 by following the displayed procedure, even if the user is not familiar with a digital device and/or a personal computer.

Additionally, operating system of some versions displays a "Wizard" dialog box by "Plug and play" when the digital still camera 100 and the personal computer 5 are connected. However, "Wizard" function of operating system displays a versatile message for use with any device. Therefore, the message displayed by "Wizard" function is often not enough for a user unfamiliar with a personal computer. According to one embodiment of the present invention, the USB connection trouble shooting software detects the version of operating system. To detect the version of operating system may be executed by using a function prepared as a function of operating system. For instance, on Windows (registered trademark), "GetVersionEx" function can be use for detection of the version. And the detection can be achieved by embedding information, about versions of operating system having a function displaying "Wizard" message, in the USB connection trouble shooting software.

If the version of operating system is a version having "Wizard" function, the USB connection trouble shooting software displays dialog box showing a setting message specialized to install a USB device driver for a digital still camera during displaying process of testing transferring digital image data. This specialized message helps a user to operate a personal computer for installing software even if the user is not familiar with a personal computer. This specialize message is displayed separately from a message of "Wizard."

FIG. 5A-G shows dialog boxes displayed in the display device 1 by the USB connection trouble shooting software.

Figure 5A:
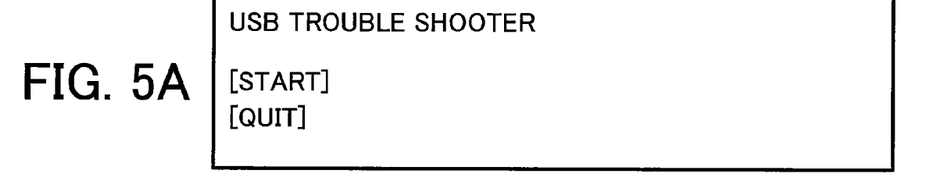
FIG. 5A-G are dialog boxes of USB connection trouble shooting software which are displayed on the display device of the personal computer as shown in FIG. 1.
Figure 5B:
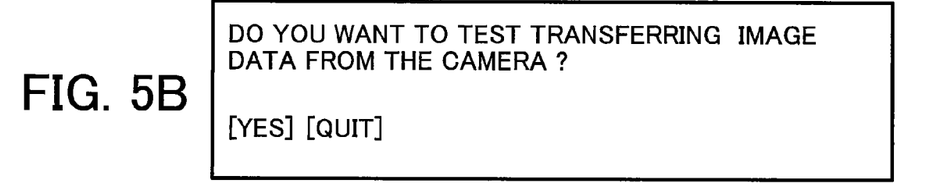
Figure 5C:
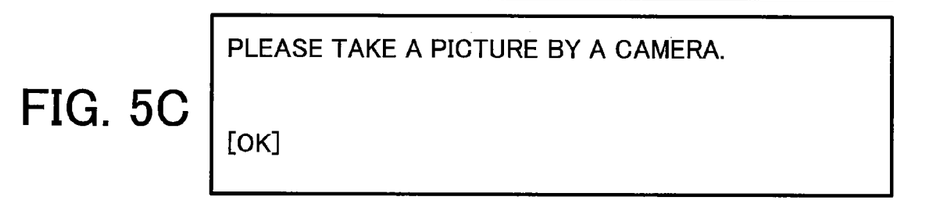
Figure 5D:
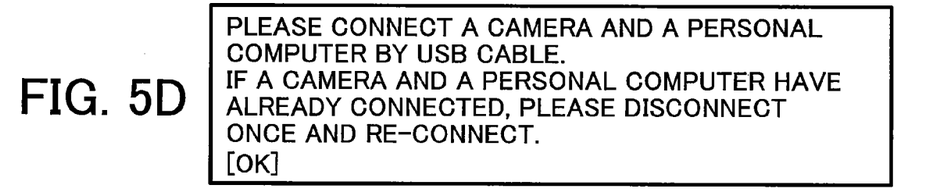
Figure 5E:
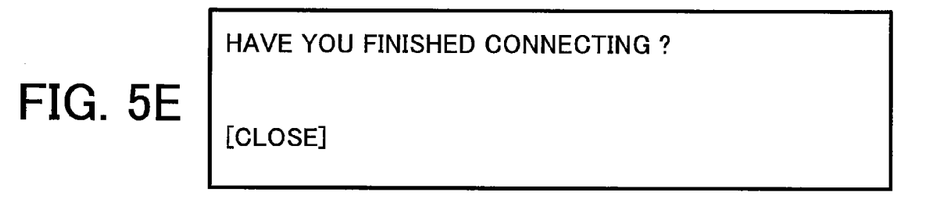
Figure 5F:
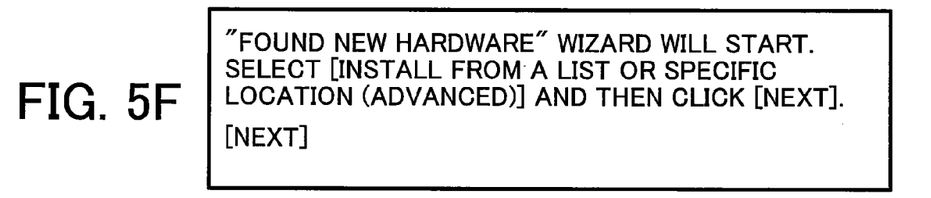
Figure 5G:
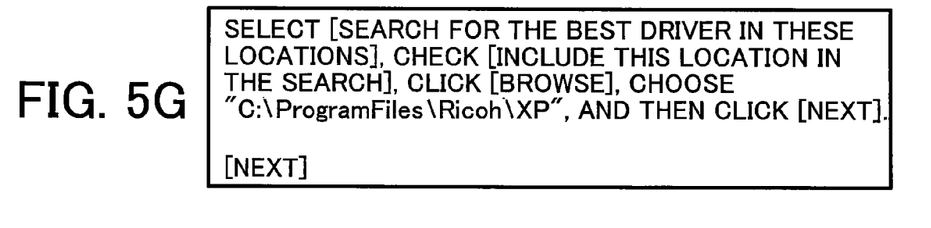
Figure 6A:
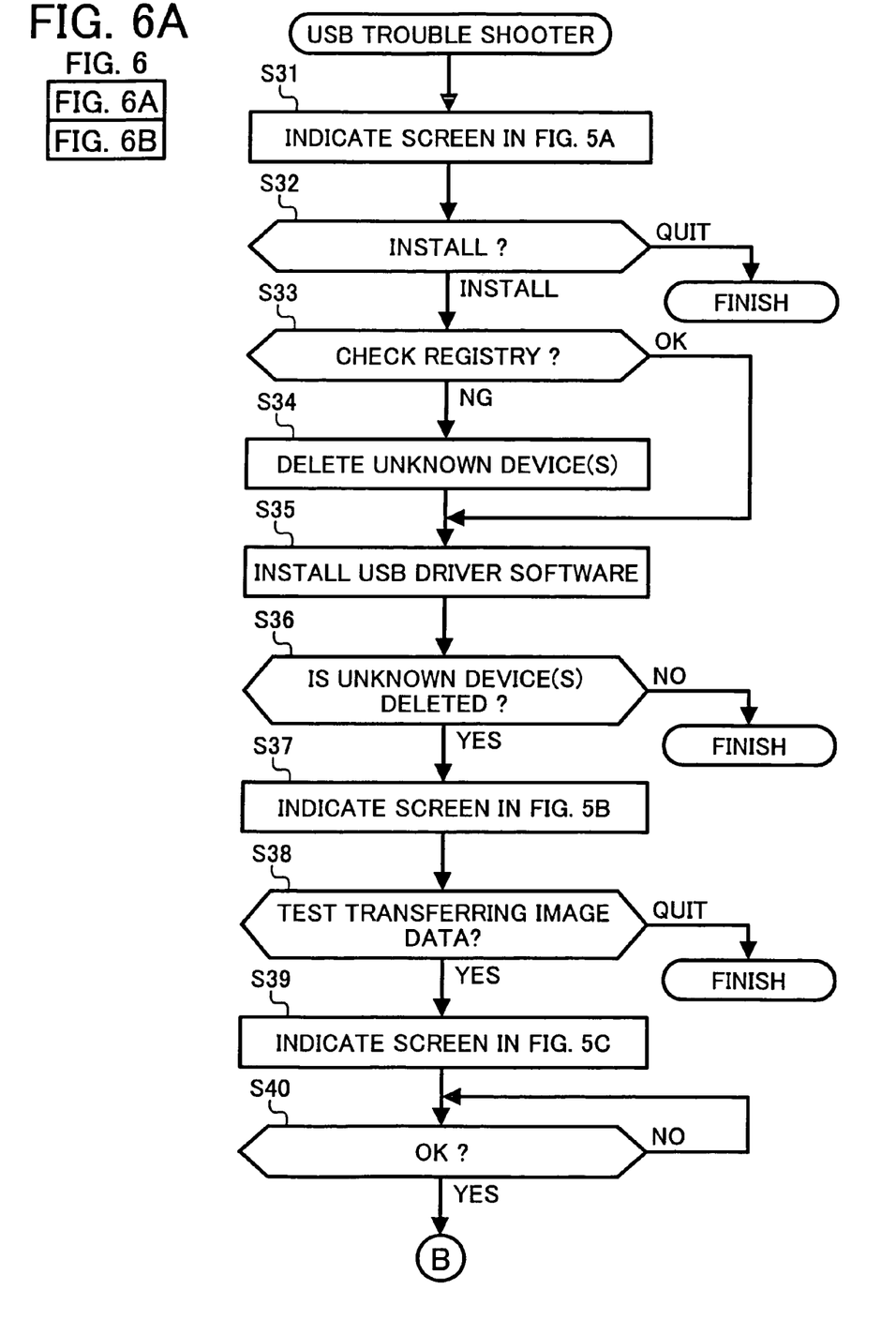
FIG. 6 is a flow chart of installation procedure by the USB connection trouble shooting software according to one embodiment of the present invention.
Figure 6B:
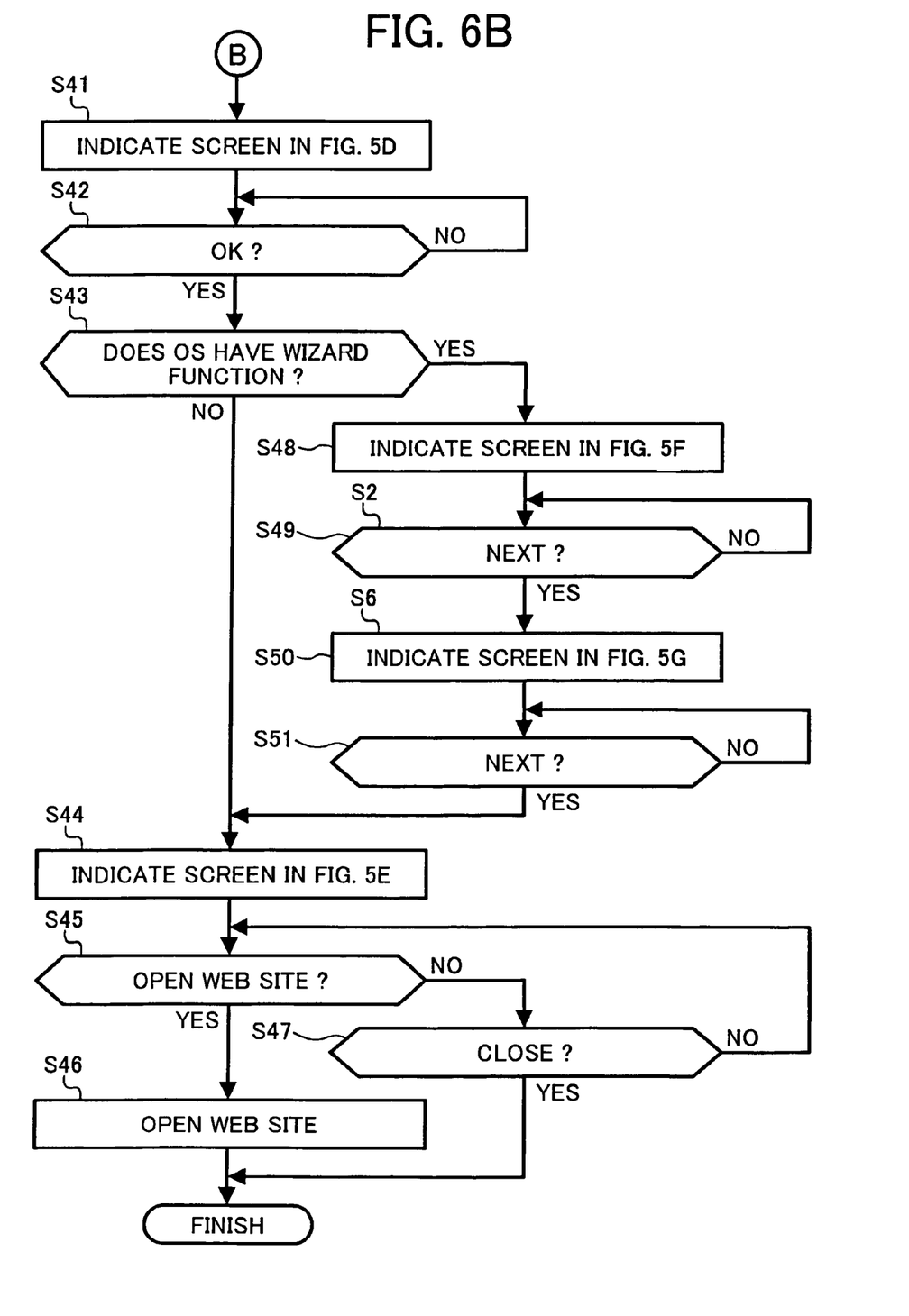

FIG. 6 is a flow chart of procedure of the USB connection trouble shooting software. One embodiment of the present invention is explained in detail by referring FIGS. 5A-G and 6.

First, the USB connection trouble shooting software displays a dialog box shown in FIG. 5A, at step S31. Next, the installation software waits for a mouse 4 clicked by a user, at step S32. If a user clicks a "Quit" button in the dialog box, the USB connection trouble shooting software erases the dialog box and the finish installation procedure. On the other hand, if a user clicks a "Install" button in the dialog box, a route of S32, the installation software starts checking registry in the personal computer 100, at step S33. If the USB connection trouble shooting software finds registry information corresponding with a device ID is unknown, the USB connection trouble shooting software deletes the unknown device from the registry, at step S34. For instance, in FIG. 7, "Device 3" and "Device 4" are unknown before checking registry, and in FIG. 8, these devices are deleted after checking.

If the USB connection trouble shooting software does not detect an unknown device, the USB connection trouble shooting software installs a USB device driver, at step S5. For instance, these software is stored into a folder "C:\program files\Ricoh\Xp" in a storage device 2b like a hard disk. Then, the USB connection trouble shooting software checks whether an unknown device is deleted, at step S36. If no device is deleted, the USB connection trouble shooting software finishes this procedure. If an unknown device is deleted in the step of S36, the USB connection trouble shooting software displays a dialog box "Do you want to test transferring image data from the camera?," at step S37, and waits a "Yes" button or a "Quit" button in the dialog box clicked by a user, at step S38. If the USB connection trouble shooting software detects a user clicks the "Quit" Button, the USB connection trouble shooting software finishes the procedure.

If a user clicks an "OK" button, the USB connection trouble shooting software displays a dialog box "Please take a picture by a camera." as shown in FIG. 5C, at step S39. After a user taking a picture by camera, when the USB connection trouble shooting software detects a user clicks a "Yes" button in the dialog box, at step S40, the USB connection trouble shooting software displays a dialog box "Please connect a camera and a personal computer by USB cable. If a camera and a personal compute have already connected, please disconnect once and re-connect," as shown in FIG. 5d, at step S41. Then, if a user clicks an "OK" button in the dialog box, at step S42, the USB connection trouble shooting software checks whether a version of operating system, on which the USB connection trouble shooting software is running, is a version having a function for displaying "Wizard." Describing more detail, the USB connection trouble shooting software execute "GetVersionEx" function, which is prepared in "Windows" as described above, and checks a return value from the function, at step S43. If the function returns a value which is not corresponding to a version having a function for displaying "Wizard," the USB connection trouble shooting software displays a dialog box "Have you finished connecting?" as shown in FIG. 5E, at step S44. Then the operating system in the personal computer 100 detects that a digital still camera 5 connection via a USB cable, and starts installing a USB device driver by "Plug and play."

Additionally, according to one embodiment of the present invention, digital image data is transferred automatically from the digital still camera 5 to a storage device in the personal computer 100 after installation of the USB device driver is finished. If the USB connection trouble shooting software detects a user clicks a "Open Web" button in the dialog box "Have you finished connecting?" shown in the step S44, the installation software detects the "Open Web" button is clicked, at step S45, and display a web page at a predetermined URL, at step S46. When a user close the web page, the USB connection trouble shooting software finishes this procedure. On the other hand, if the USB connection trouble shooting software does not detect the "Open web" button is clicked at the step of S45 the installer checks whether a "Close" button in the dialog box is clicked. When the USB connection trouble shooting software detects the "Close" button is clicked, at step S47, and finishes this procedure, at step S16. Otherwise, the USB connection trouble shooting software goes back to the step of S45.

If a version of operating system is a version having a function for displaying "Wizard" at the step of S43, the USB connection trouble shooting software displays a dialog box "'Found New Hardware' Wizard will start. Select [Install from a list or specific location (Advanced)] and then click [Next]," as shown in FIG. 5F, at step S48, and waits a user clicks a "next" button in the dialog box, at step S49. When the USB connection trouble shooting software detects a user clicks the "Next" button, the USB connection trouble shooting software displays a dialog box "Select [Search for the best driver in these locations], check [Include this location in the search], click [Browse], choose 'C:\Program Files\Ricoh\XP', and then Click [Next]," at step S50, and waits a user clicks "Next" button in the dialog box, at step S51. When the USB connection trouble shooting software detects a user clicks the "Next" button, the installer software go to the step of S44. After the step of S44, the USB connection trouble shooting software detects execute a similar procedure with the case that an unknown device did not deleted.

As described above, according to one embodiment of the present invention, the USB connection trouble shooting software analyzes installation condition of a USB device driver and displays a detail setting procedure corresponding to a "Wizard" dialog box displayed by operating system in response with a kind of operating system. Especially, it prevents a user confused that the USB connection trouble shooting software displays a re-installation procedure of a USB device driver only when registering a digital still camera to a personal computer is failed. Therefore a user can easily installs software, such as a USB device driver, by tracing a detail setting procedure displayed by the USB connection trouble shooting software, even if the user is not familiar with a digital device and/or a personal computer. And a user can also make sure that digital image data is correctly transferred from a digital still camera to a personal computer. Therefore, the present invention can reduce frequency of a user asking a digital still camera manufacturer about transferring a digital still camera to a personal computer, and reduce support cost of a manufacturer, such as salary of operators, communication fee of toll free dial and so forth.

Additionally, according to one embodiment of the present invention, the USB connection trouble shooting software can browse a web page, and a user can be see more information about question, problem or the like in install procedure. In the above description, the USB connection trouble shooting software installs an application and a USB device driver, and tests transferring digital image data after installation. However, it can be achieved by preparing an installer software only installing an application and/or a USB device driver, test software testing transferring digital image data and the USB connection trouble shooting software executing software run the installer software and the test software serially.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

The present invention thus also includes a computer-based product which may be hosted on a storage medium and include instructions which can be used to program a microprocessor to perform a process in accordance with the present invention. This storage medium can include any type of disk including floppy disks, optical disks, CD-ROMs, magneto-optical disks, ROMs, RAMs, EPROMs, EEPROMs, flash memory, magnetic or optical cards, or any type of media suitable for-storing electronic instructions.

This patent specification is based on Japanese patent application, No. 2004-044982 filed on Feb. 20, 2004, and No. 2004-317306 filed on Oct. 29, 2004, in the Japanese Patent Office, the entire contents of which are incorporated by reference herein.

What is claimed is:

1. A computer implemented method, comprising:
displaying first text in a form of a first dialogue box by an operating system, the first dialogue box displaying the first text and being for installation of a driver for a new hardware, the first dialogue box for receiving a selection from a user regarding the installation of the driver;
simultaneously displaying second text in a second dialogue box outside of the first dialogue box, the second text being displayed in the second dialog box by an installer software of the new hardware which is a source independent from the operating system, the second text for assisting the user on how to proceed with the installation and providing information regarding the installation of the driver supplemental to what is provided by the first dialogue box;
receiving the selection from the user; and
installing the driver which corresponds to the selection.

2. The method according to claim 1, further comprising:
displaying third text using a third dialogue box, the third text including at least one of:
a prompt to the user to decide whether or not to install a software;
a prompt to the user to decide whether or not to test the software;
a prompt to the user to take a picture;
a prompt to the user to establish a connection between a peripheral device and the computer; and
a prompt to the user to determine if the computer recognizes the peripheral device.

3. The method of claim 1, further comprising:
checking a registry of drivers on a computer; and
deleting an unknown driver from the computer.

4. The method according to claim 1, wherein the installer software detects a version of the operating system.

5. The method according to claim 1, wherein the installer software is configured to browse a web page that provides the user additional information about the installation of the driver.

6. A computer readable storage medium comprising:
displaying first text in a form of a first dialogue box by an operating system, the first dialogue box displaying the first text and being for installation of a driver for a new hardware, the first dialogue box for receiving a selection from a user regarding the installation of the driver;
simultaneously displaying the second text in a second dialogue box outside of the first dialogue box, the second text being displayed in the second dialog box by an installer software of the new hardware which is a source independent from the operating system, the second text for assisting the user on how to proceed with the installation and providing information regarding the installation of the driver supplement to what is provided by the first dialogue box;
receiving the selection from the user; and
installing the driver which corresponds to the selection.

* * * * *